United States Patent
Wang et al.

(10) Patent No.: US 10,209,846 B2
(45) Date of Patent: Feb. 19, 2019

(54) TOUCH SENSING APPARATUS HAVING A MULTI-TURN PLANAR COIL INDUCTOR AND TOUCH SCREEN THEREOF

(71) Applicant: BOE TECHNOLOGY GROUP CO., LTD., Beijing (CN)

(72) Inventors: Hong Wang, Beijing (CN); Chengqi Zhou, Beijing (CN); Yaoqiu Jing, Beijing (CN); Min Peng, Beijing (CN); Shou Li, Beijing (CN); Chengte Lai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/550,479

(22) PCT Filed: Feb. 27, 2017

(86) PCT No.: PCT/CN2017/075019
§ 371 (c)(1),
(2) Date: Aug. 11, 2017

(87) PCT Pub. No.: WO2017/185875
PCT Pub. Date: Nov. 2, 2017

(65) Prior Publication Data
US 2018/0067590 A1    Mar. 8, 2018

(30) Foreign Application Priority Data

Apr. 28, 2016 (CN) .......................... 2016 1 0280792

(51) Int. Cl.
*G06F 3/046* (2006.01)
*G02F 1/1333* (2006.01)
(Continued)

(52) U.S. Cl.
CPC .......... *G06F 3/046* (2013.01); *G02F 1/13338* (2013.01); *G02F 1/133512* (2013.01); *G06F 3/044* (2013.01); *G06F 3/0412* (2013.01)

(58) Field of Classification Search
CPC ....................................................... G06F 3/046
(Continued)

(56) References Cited

U.S. PATENT DOCUMENTS 9,194,985 B1    11/2015   Feng et al.
2011/0221698 A1   9/2011   Ku et al.
(Continued)

FOREIGN PATENT DOCUMENTS

CN     103376591 A    10/2013
CN     103913873 A    7/2014
(Continued)

OTHER PUBLICATIONS

International Search Report & Written Opinion dated May 27, 2017, regarding PCT/CN2017/075019.
(Continued)

*Primary Examiner* — Long D Pham
(74) *Attorney, Agent, or Firm* — Intellectual Valley Law, P.C.

(57) ABSTRACT

The present application discloses a touch sensing apparatus for detecting a touch motion by induction. The touch sensing apparatus includes a base substrate; a black matrix layer on the base substrate defining a plurality of light transmissive regions; an inductor layer on the base substrate, the inductor layer including at least one inductor unit, each of the at least one inductor unit having a multi-turn planar coil structure, a projection of the inductor layer on the base substrate substantially overlapping with that of a portion of the black matrix layer; and at least one first sensing circuit coupled to the at least one inductor unit and configured to be provided (Continued)

with an AC signal and to detect a change of the AC signal induced by the touch motion.

17 Claims, 7 Drawing Sheets

(51) Int. Cl.
  *G02F 1/1335* (2006.01)
  *G06F 3/044* (2006.01)
  *G06F 3/041* (2006.01)
(58) Field of Classification Search
  USPC .......................................................... 345/173
  See application file for complete search history.

(56) References Cited

U.S. PATENT DOCUMENTS

| | | | | |
|---|---|---|---|---|
| 2014/0118283 | A1* | 5/2014 | Wang | .................... G06F 3/0412 345/173 |
| 2014/0354560 | A1* | 12/2014 | Kim | ........................ G06F 3/041 345/173 |
| 2015/0042604 | A1 | 2/2015 | Lu et al. | |
| 2016/0124562 | A1 | 5/2016 | Lu et al. | |
| 2016/0154511 | A1* | 6/2016 | Yao | ....................... G06F 3/0412 345/174 |
| 2016/0291359 | A1 | 10/2016 | Jin et al. | |

FOREIGN PATENT DOCUMENTS

| | | |
|---|---|---|
| CN | 104007876 A | 8/2014 |
| CN | 104076551 A | 10/2014 |
| CN | 104090414 A | 10/2014 |
| CN | 104298411 A | 1/2015 |
| CN | 104714707 A | 6/2015 |
| CN | 105224152 A | 1/2016 |
| EP | 2772838 A1 | 9/2014 |

OTHER PUBLICATIONS

Chinese Search Report in the Chinese Patent Application No. 201610280792.1, dated Sep. 22, 2016; English translation attached.
First Office Action in the Chinese Patent Application No. 201610280792.1, dated Nov. 22, 2016; English translation attached.
Second Office Action in the Chinese Patent Application No. 201610280792.1, dated Apr. 6, 2017; English translation attached.
Decision of Rejection in the Chinese Patent Application No. 201610280792.1, dated Aug. 31, 2017; English translation attached.

* cited by examiner

TOUCH SENSING APPARATUS HAVING A MULTI-TURN PLANAR COIL INDUCTOR AND TOUCH SCREEN THEREOF

CROSS-REFERENCE TO RELATED APPLICATION

This application is a national stage application under 35 U.S.C. § 371 of International Application No. PCT/CN2017/075019 filed Feb. 27, 2017, which claims priority to Chinese Patent Application No. 201610280792.1, filed Apr. 28, 2016, the contents of which are incorporated by reference in the entirety.

TECHNICAL FIELD

The present invention relates to display technique, particularly to a touch sensing apparatus, a touch screen, a display panel, and a display apparatus.

BACKGROUND

Touch screens have been widely used as a direct, convenient, and fast-responsive interactive interface in many applications of consumer electronics products such as smart phones, tablet computers, and notebook computers. Currently, a capacitor-based touch screens have been the main stream technology in the display field. Examples of capacitor-based touch screens include One Glass Solution (OGS)-type touch screens, Glass-Glass (GG)-type touch screens, and Glass-Film-Film (GFF)-type touch screens.

SUMMARY

In one aspect, the present invention provides a touch sensing apparatus for detecting a touch motion by induction comprising a base substrate; a black matrix layer on the base substrate defining a plurality of light transmissive regions; an inductor layer on the base substrate, the inductor layer comprising at least one inductor unit, each of the at least one inductor unit having a multi-turn planar coil structure, a projection of the inductor layer on the base substrate substantially overlapping with that of a portion of the black matrix layer; and at least one first sensing circuit coupled to the at least one inductor unit and configured to be provided with an AC signal and to detect a change of the AC signal induced by the touch motion; wherein each of the at least one inductor unit comprises a first terminal and a second terminal, each of the at least one first sensing circuit comprises an output port coupled to the first terminal of a corresponding inductor unit, the AC signal being provided to the corresponding inductor unit through the output port, and the second terminal being provided with a common voltage.

Optionally, a line width of the multi-turn planar coil structure is substantially the same as or smaller than a line width of the black matrix layer.

Optionally, the multi-turn planar coil structure comprises a plurality of substantially parallel adjacent line segments, each two parallel adjacent line segments being spaced apart by no more than two light transmissive regions.

Optionally, the multi-turn planar coil structure comprises a plurality of substantially parallel adjacent line segments, each two parallel adjacent line segments being spaced apart by a single light transmissive region.

Optionally, the multi-turn planar coil structure is selected from a group consisting of a square multi-turn spiral coil, and a rectangular multi-turn spiral coil.

Optionally, each of the at least one first sensing circuit further comprises a common voltage terminal coupled to the second terminal of the corresponding inductor unit, the common voltage terminal and the second terminal being provided with a common voltage.

Optionally, the at least one inductor unit comprise a plurality of inductor units arranged in a matrix on the base substrate, the at least one first sensing circuit comprises a plurality of first sensing circuits coupled to the plurality of inductor units respectively, each of the plurality of first sensing circuits is configured to independently detect the change of AC signal in one of the plurality of inductor units induced by the touch motion.

Optionally, the touch sensing apparatus further comprises a data selection circuit configured to receive one or more of changes of AC signals from one or more of the plurality of first sensing circuits, select any one of the one or more of changes of AC signals transmitted from the one or more of the plurality of first sensing circuit as a selected change of AC signal, and output the selected change of AC signal.

Optionally, the inductor layer is on a side of the black matrix layer distal to the base substrate.

Optionally, the inductor layer is on a side of the black matrix layer proximal to the base substrate.

Optionally, the inductor layer is on a side of the base substrate distal to the black matrix layer.

Optionally, the base substrate is a base substrate of a color filter substrate in a display panel, each of the plurality of light transmissive regions corresponding to a subpixel region of the display panel.

Optionally, the base substrate is a base substrate of an array substrate in a display panel, each of the plurality of light transmissive regions corresponding to a subpixel region of the display panel.

In another aspect, the present invention provides a display substrate comprising the touch sensing apparatus described herein.

Optionally, the display substrate is a color filter substrate comprising a common electrode layer; each of the at least one first sensing circuit comprises an output port coupled to a first terminal of the at least one inductor unit and a common voltage terminal coupled to a second terminal of the at least one inductor unit, the AC signal being provided to the inductor unit through the output port, and the common voltage terminal and the second terminal are coupled to the common electrode layer.

Optionally, the color filter substrate further comprising an insulating layer between the inductor layer and the common electrode layer, the second terminal is coupled to the common electrode layer through a via extending through the insulating layer.

In another aspect, the present invention provides a display panel comprising the display substrate described herein.

In another aspect, the present invention provides a display apparatus comprising the display panel described herein.

In another aspect, the present invention provides a method for fabricating a touch sensing apparatus for detecting touch motion by induction, comprising forming a black matrix layer on a base substrate thereby defining a plurality of light transmissive regions; forming an inductor layer on the base substrate, the inductor layer is formed to comprise at least one inductor unit having a multi-turn planar coil structure, a projection of the inductor layer on the base substrate substantially overlapping with that of a portion of the black matrix layer; and forming at least one first sensing circuit coupled to the at least one inductor unit and configured to be provided with an AC signal and to detect a change of the AC signal induced by the touch motion.

In another aspect, the present invention provides a method of fabricating a display substrate, comprising forming a black matrix layer on a base substrate, wherein the black matrix layer is formed to define a plurality of light transmissive regions; forming an inductor layer comprising a plurality of inductor units on the base substrate, each of the plurality of inductor units having a multi-turn planar coil structure, a projection of the inductor layer on the base substrate substantially overlapping with that of a portion of the black matrix layer; and forming at least one first sensing circuit coupled to the plurality of inductor units and configured to be provided with an AC signal and to detect a change of the AC signal induced by the touch motion.

Optionally, the method further comprises forming a common electrode layer; wherein each of the plurality of inductor units is formed to comprise a first terminal and a second terminal, each of the plurality of first sensing circuits is formed to comprise an output port coupled to the first terminal and a common voltage terminal coupled to the second terminal, the AC signal is provided to the inductor through the output port, and the common voltage terminal and the second terminal are coupled to the common electrode layer.

Optionally, the method further comprises forming an insulating layer between the inductor layer and the common electrode layer, and forming a conductor via extending through the insulating layer; wherein the second terminal is coupled to the common electrode layer through the via extending through the insulating layer.

BRIEF DESCRIPTION OF THE FIGURES

The following drawings are merely examples for illustrative purposes according to various disclosed embodiments and are not intended to limit the scope of the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Conventional capacitor-based touch screens can only sense the finger touching when the finger is in a very close distance (e.g., <0.5 mm) to the outer surface of the touch screen. When the user wears a glove made of a thick insulation medium, the touch sensor can fail to sense a touch. Therefore, it is an unsolved technical problem in the field to enhance sensitivity and effective range of a touch screen for detecting a touch motion.

Accordingly, the present disclosure provides, inter alia, a touch sensing apparatus, a touch screen, a display panel, and a display apparatus having the same, and a method for forming a touch-control display panel thereof that substantially obviate one or more of the problems due to limitations and disadvantages of the related art. In one aspect, the present disclosure provides a touch sensing apparatus for detecting a touch motion by induction. In some embodiments, the touch sensing apparatus includes a base substrate; a black matrix layer on the base substrate defining a plurality of light transmissive regions; an inductor layer on the base substrate, the inductor layer including at least one inductor unit, each of the at least one inductor unit having a multi-turn planar coil structure, a projection of the inductor layer on the base substrate substantially overlapping with that of a portion of the black matrix layer; and at least one first sensing circuit coupled to the at least one inductor unit and configured to be provided with an AC signal and to detect a change of the AC signal induced by the touch motion.

Figure 1:
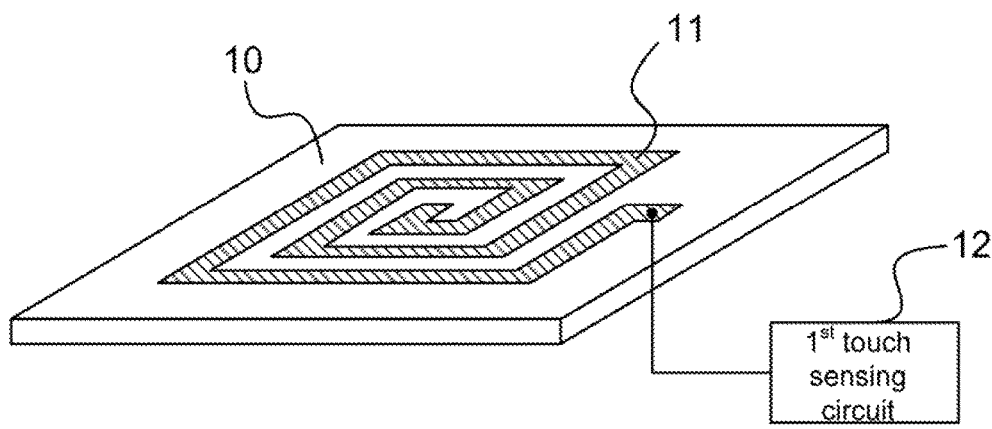
FIG. 1 is a schematic structure diagram of a touch sensing apparatus according to an embodiment of the present disclosure.

FIG. 1 is a schematic structure diagram of a touch sensing apparatus according to an embodiment of the present disclosure. Referring to FIG. 1, the touch sensing apparatus includes an inductor layer having at least one inductor unit 11 having a multi-turn planar coil pattern formed on a base substrate 10 and at least one first sensing circuit 12 coupled to the at least one inductor unit 11 of the inductor layer. The inductor layer is formed by patterning a conductive layer in a certain thickness range overlying the base substrate 10 to obtain the multi-turn planar coil pattern. Optionally, each inductor unit 11 is a linear conductive wire of a length arranged in a substantial coil shape. The length is defined from a first terminal to a second terminal, which yields a certain inductance value for a certain thickness of the inductor layer. Optionally, the length is selected to be sufficiently large to render the inductance value of the inductor unit 11 no smaller than a pre-set value. Of course, the conductive layer used for forming the conductive wire can be placed at different levels in the substrate and may have varying thickness.

Referring to FIG. 1, the first sensing circuit 12 includes an output port that can be coupled to one of the two terminals of the inductor unit 11. The first sensing circuit 12 uses the output port to apply a pre-set AC signal to the inductor 11 through the terminal to the planar coil pattern of the inductor unit 11. Depending on the types of the AC signal to be applied, the first sensing circuit 12 can be provided with different functional circuits. For example, if the AC signal is a sine signal, the first sensing circuit 12 can be a capacitor-based signal generation circuit, such as an RC oscillation circuit, an LC oscillation circuit, or a quartz crystal oscillation circuit. If the AC signal is a non-sine signal, the first sensing circuit 12 can be a signal generation circuit including an operational amplifier, such as a square wave generation circuit made by an RC oscillator combined with a hysteresis comparator or made by a multi-vibrator driven by a 555 timer. Depending on applications, the AC signal can be supplied to the first sensing circuit 12 from different sources. Optionally, the AC signal is supplied to the first sensing circuit 12 from an external circuit and then applied to the inductor unit 11.

As the inductor unit 11 is made by the linear conductive wire having sufficient long length arranged in the planar coil pattern, the AC signal provided from the first sensing circuit 12 is able to induce a magnetic field with varying strength in nearby space around the planar coil pattern of the inductor unit 11. When a conductor (e.g., skin of a finger) is placed at a position near the varying magnetic field, interaction between the conductor and the magnetic field can result in magnetic field energy loss depending on a distance between the conductor and the planar coil pattern of the inductor unit 11. This is directly reflected in an amplitude drop of the AC signal within the conductive wire of the planar coil pattern which is in turn detectable by the first sensing circuit 12.

In some embodiments, the conductor is a dermis of a finger, when the finger is touching a glass cover over the base substrate at a corresponding region above the planar coil pattern of the inductor 11, the AC signal in the conductive coil drops. The magnitude of the change of the AC signal depends on the distance between the finger and the inductor unit 11. Accordingly, the correlation between the amplitude drops of the AC signal and the distances between the finger and the planar coil pattern of the inductor unit 11 may be established in advance. The touch motion can be detected based on a detected change of the AC signal in the conductive coil of the inductor unit 11 and the established correlation. Optionally, the first sensing circuit 12 is capable of comparing, in situ, the AC signal detected from the inductor unit it and a control AC signal value so as to sense any specific finger touch motion near the planar coil pattern of the inductor unit 11. In an embodiment, the first sensing circuit 12 includes an operational-amplifier-based signal comparator or a mode-transformer-based signal collector thereby achieving the touch sensing function. Other sensing circuitries may also be used to achieve a similar sensing function.

In some embodiments, the present disclosure provides an induction-based touch sensing apparatus that is based on a finger touch motion on an inductor unit carried with a pre-set AC signal. The present induction-based touch sensing apparatus has a much larger effective sensible distance of touch motion compared to the conventional capacitor-based touch sensing apparatus. By having a larger effective sensible distance, enhanced accuracy and sensitivity of touch sensing can be achieved in the present touch sensing apparatus, providing a superior touch control function.

Figure 2A:
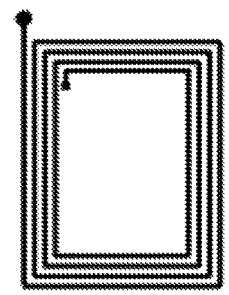
FIGS. 2A-2D are top views of respective inductor planar coil patterns of touch sensing apparatuses according to some embodiments of the present disclosure.
Figure 2B:
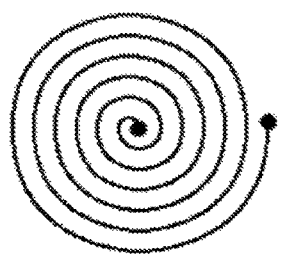
Figure 2C:
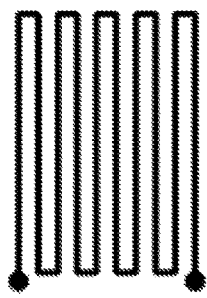
Figure 2D:
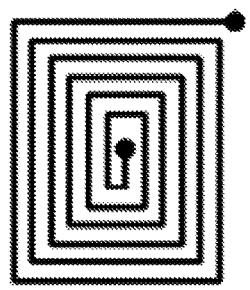

The planar coil patterns of the inductor formed on the base substrate may have various appropriate shapes or layouts. Examples of appropriate coil structures include, but are not limited to, a square multi-turn spiral coil, a rectangular multi-turn spiral coil, a circular multi-turn spiral coil, and a multi-turn square waveform coil. FIGS. 2A-2D are top views of respective two-dimensional inductor coil patterns of several exemplary touch sensing apparatuses according to some embodiments of the present disclosure. FIG. 2A shows a pattern equivalent to a multi-turn planar coil of a single wire surrounding a rectangle region. FIG. 2B shows another pattern equivalent to a circular multi-turn planar coil of a single wire circulating a common axis. FIG. 2C shows yet another pattern equivalent to a multi-turn planar square-wave coil of a single wire. The single wire is arranged back and forth in a first direction and as a whole progressing along a path in a second direction substantially perpendicular to the first direction. FIG. 2D shows still another pattern equivalent to a multi-turn planar spiral coil of a single wire arranged in a spiral form circulating a common axis and starting from a central terminal. As used herein, the term "multi-turn coil" refers to a single coil that is wound with a plurality of turns. Optionally, the plurality of turns are wound continuously. The plurality of turns may include multiple substantially full turns. For example, the multi-turn planar coil depicted in FIG. 2A shows a four-turn winding. Optionally, the plurality of turns include multiple substantially full turns and one or more partial turns. For example, the multi-turn planar coil depicted in FIG. 2D includes five full turns and a partial turn (e.g., a ⅞ partial turn). The term "multi-turn planar coil" refers to a multi-turn coil in which the plurality of turns are substantially co-planar. Optionally, the plurality of turns are substantially co-planar even though there are height differences due to an uneven surface on which the multi-turn coil is formed. Optionally, the plurality of turns are co-planar when they are in a single layer, e.g., patterned in a same process. For example, in the multi-turn planar coil depicted in FIG. 2A, the four turns are substantially on a same plane, the second turn surrounding the first turn (the inner turn), the third turn surrounding the second turn, and the fourth turn (the outer turn) surrounding the third turn.

In some embodiments, the planar coil pattern of the inductor unit 11 produces, when supplied with an AC current signal, a magnetic field with major magnetic induction lines substantially centralized around a center of the planar coil pattern and perpendicular to a plane of the planar coil. Accordingly, an inductor unit 11 having a planar coil pattern is very sensitive to a finger motion in a vertical direction, greatly enhancing the touch control effect of the touch sensing apparatus. Moreover, on a base substrate having a black matrix layer for forming a display panel, the inductor having a single wire planar coil pattern such as the ones shown in FIG. 2C and FIG. 2D can be laid in a dense arrangement, a projection of which on the base substrate substantially overlapping with that of a part of the black matrix layer. For a given length of the wire, the dense arrangement of the planar coil pattern occupies a minimum area of the base substrate. As a result, for a finite surface area of a base substrate, more inductor units with the same planar coil pattern can be disposed. Alternatively, given a same area for each inductor unit, the dense arrangement of the planar coil pattern allows each inductor to have a longer length between their two terminals, yielding a higher inductance value. Accordingly, the present touch sensing apparatus is capable of providing an enhanced sensitivity for detecting touch motion and an improved touch control effect.

Optionally, the conductive wire or layer used for forming the inductor unit 11 of FIG. 1 can be made by a conductor material with a sufficiently high electrical conductivity. Examples of conductor materials include, but are not limited to, iron (Fe), silver (Ag), nickel (Ni), cobalt (Co), zinc (Zn), tin (Sn), gold (Au), aluminum (Al), platinum (Pt), palladium (Pd), lead (Pb), copper (Cu), silicon (Si), beryllium (Be), manganese (Mn), germanium (Ge), gallium (Ga), lithium (Li), magnesium (Mg), and an alloy of or a laminate of any combination of above materials.

Figure 3:
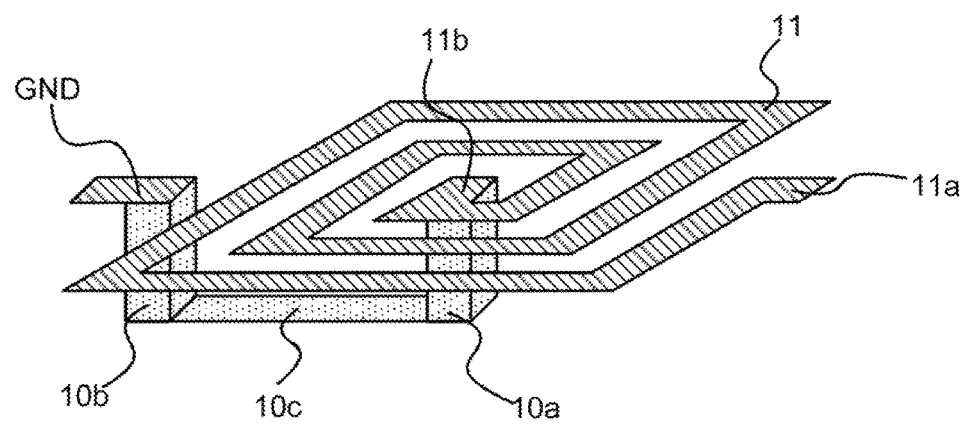
FIG. 3 is a schematic diagram of an inductor coil connection according to an embodiment of the present disclosure.

FIG. 3 is a schematic diagram of an inductor planar coil connection according to an embodiment of the present disclosure. Referring to FIG. 3, the inductor unit 11 has a first terminal 11a and a second terminal 11b, providing a length that yields an inductance value no smaller than a pre-set value. The pre-set value may be determined based on certain touch sensing criteria or product specification defined for a touch control display panel or a touch screen. Optionally, the first terminal 11a can be connected to an output port of a first sensing circuit (e.g., the first sensing circuit 12 in FIG. 1) using a conductor structure formed on the base substrate. Optionally, to make the signal applied to the planar coil pattern more stable, the second terminal 11b is connected to a common voltage terminal GND of the display panel shared with the first sensing circuit 12.

Referring to FIG. 3, the second terminal 11b may be connected to the common voltage terminal GND through a conductive structure in a layer different from the inductor layer having the inductor unit 11 (e.g., the planar coil). As shown in FIG. 3, the second terminal 11b is connected to the common voltage terminal GND through a first conductor structure 10a, a second conductor structure 10b, and a third conductor structure 10c, the third conductor structure 10c being in a second layer different from the inductor layer. The first conductor structure 10a is formed by disposing a conductor material in a first through-hole via structure, and similarly, the second conductor structure 10b is formed by disposing a second through-hole via structure with a conductor material. A third conductor structure 10c in the second layer is formed to connect the first conductor structure 10a and the second conductor structure 10b. The second conductor structure 10b is connected to the common voltage terminal GND thereby connecting the second terminal 11b of the inductor unit 11 to the common voltage terminal GND. Optionally, the second terminal 11b of the inductor unit 11 may be connected to the GND through a conductor structure in a same layer as the inductor layer. Optionally, the first terminal 11a of the inductor unit 11 is connected to the output port of the first sensing circuit through a conductor structure in a through-hole via.

Figure 4:
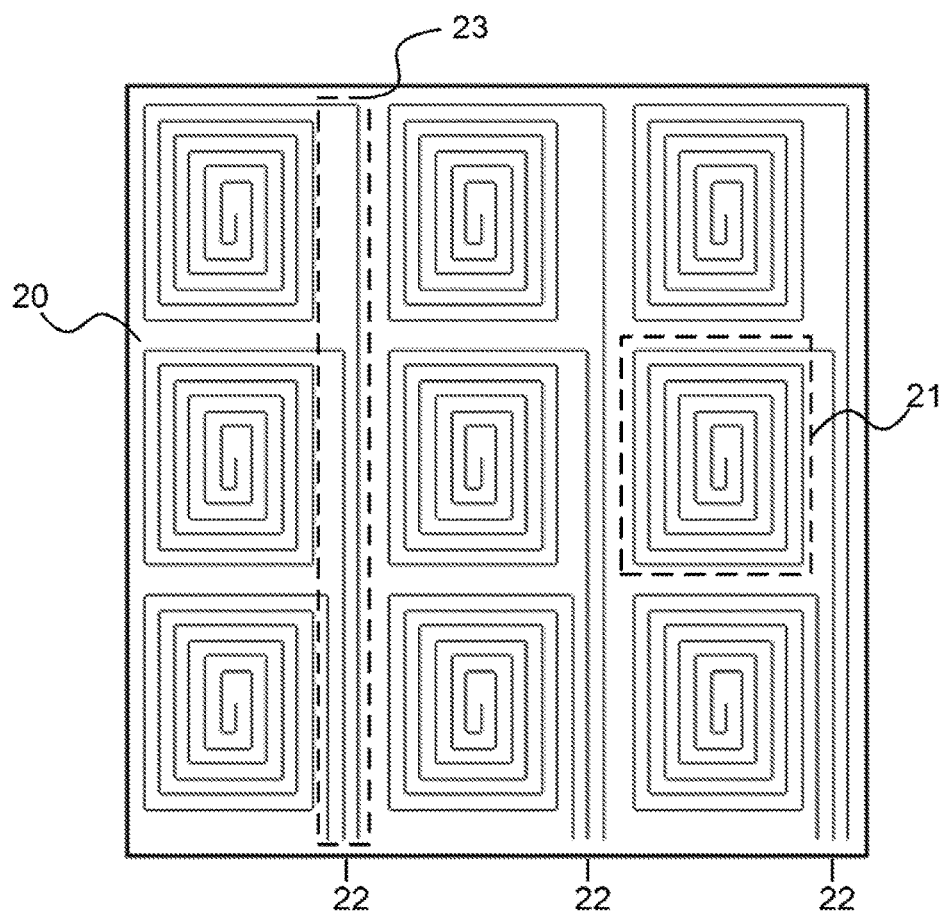
FIG. 4 is a top view of a local region of a touch screen having a plurality of inductor units according to some embodiments of the present disclosure.

FIG. 4 is a top view of a local region of a touch screen having a plurality of inductor units according to some embodiments of the present disclosure. Optionally, a touch screen 20 is configured to dispose as many inductor units 21 as the total available screen area possibly allowed. Each inductor unit 21 includes a planar coil inductor, the touch screen 20 includes a plurality of inductor units 21 arranged in dense arrangement on the touch screen 20. A second sensing circuit 22 is provided, at an alternative plane behind the touch screen 20 (not visible in this top view), to connect each of the plurality of inductor units 21 having a planar coil structure. The second sensing circuit 22 is used to apply a pre-set AC signal to each inductor unit 21 having the planar coil structure and configured to compare a sensed induction signal generated by each inductor unit 21 with the pre-set AC signal for sensing a finger touch motion on the touch screen and identifying particular positions where the finger touched. The touch screen may be used separately as a touch control apparatus. Optionally, the touch screen 20 is a base substrate of a display panel.

In an alternative embodiment, the present disclosure provides a touch sensing apparatus having a plurality of inductors disposed on a base substrate 20 in a display panel. A black matrix layer is formed on the base substrate to define a plurality of light transmissive regions. The touch sensing apparatus can be formed with each inductor occupying a minimum area of the base substrate one next to another separated only by no more than two light transmissive regions. Each inductor unit 21 has a planar coil pattern and is independently coupled to a first sensing circuit of FIG. 1. The touch sensing apparatus includes a second sensing circuit 22 having a data selection circuit (not explicitly shown in the FIG. 4) coupled to each of the plurality of first sensing circuits (e.g., the first sensing circuit 12 of FIG. 1) respectively which in turn coupled to the plurality of inductor units disposed at different regions on the same base substrate 20. For example, three rows and three columns of 9 inductor unit 21 having a planar coil structure are laid over a location area of the base substrate 20. Each first sensing circuit 12 is independently coupled to a first terminal of each corresponding inductor unit 21 having a planar coil structure. A common voltage terminal shared by all the first sensing circuits 12 is coupled to a second terminal of each corresponding inductor unit 21. Each first sensing circuit 12 is configured for individually detecting a change of a respective AC signal thereof caused by magnetic field induction from a touch motion. The second sensing circuit 22 is then configured to receive signals selected by the data selection circuit from one or more of the plurality of first sensing circuits 12 that are affected by the touch motion of a finger placed over a particular area above the cover glass of the base substrate 20. By comparing the received signals with the corresponding pre-set AC signals applied to the one or more of the plurality of first sensing circuits 12 respectively, the touch motion can be sensed by the second sensing circuit 22 and characterized by its distance on the base substrate as well as its location indicated by one-to-one correspondence relation between each inductor unit 21 and a first sensing circuit 12. For example, each first sensing circuit 12 is assigned with a serial number associated with a location on the base substrate. When the data selection circuit receives a sensing signal from a particular first sensing circuit 12, the data selection circuit also receives the location information for the second sensing circuit 22.

In an alternative embodiment, the touch screen 20 is a separate base substrate formed with an inductor layer of a plurality of inductor unit 21 and can be integrated with a display panel by disposing the base substrate on top of a display substrate. As the inductor layer is formed on the touch screen that is engaged with the display substrate, even it can be made by transparent conductive material, the light transmittance of the display panel may be still affected. In order to minimize visual interference of the inductor planar coil patterns of inductor layer in the touch screen 20, the conductive wire of each inductor unit 21 is disposed in a position substantially free of blocking light transmissive regions defined by a black matrix layer on the display substrate. In particularly, the layout of the inductor layer can be made such that a projection of each planar coil pattern on the touch screen base substrate substantially overlapping with that of a portion of the black matrix layer on the display substrate as the touch screen is assembled with the display panel.

Figure 5:
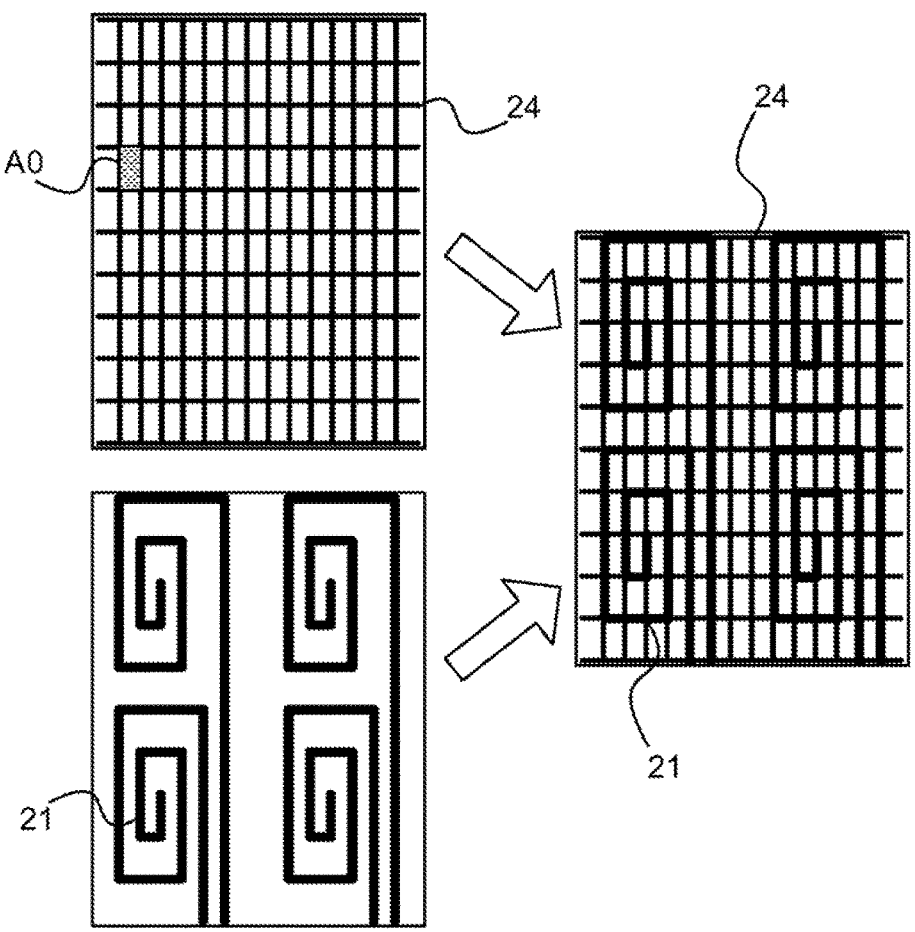
FIG. 5 is a schematic diagram showing projection correspondence relationship between multiple inductor planar coil patterns and a black matrix layer according to some embodiments of the present disclosure.

FIG. 5 is a schematic diagram showing projection correspondence relationship between multiple inductor planar coil patterns and a black matrix layer according to some embodiments of the present disclosure. Referring to FIG. 5, a black matrix layer 24 includes a grid of shading lines defining a plurality of light transmissive regions, such as a region A0. The black matrix layer can be formed on a base substrate. Optionally, the base substrate is a base substrate for a color filter substrate of a display panel. Optionally, the base substrate is a base substrate for an array substrate of a display panel. The layout of the plurality of light transmissive regions is based on pixel distribution in the display panel. In an example, each light transmissive region corresponds to a subpixel region of the display panel. As used herein, a subpixel region refers to a light emission region of a subpixel, such as a region corresponding to a pixel electrode layer in a liquid crystal display, a region corresponding to a light emissive layer in an organic light emitting diode display panel, or a region corresponding to the light transmissive region in the present disclosure.

As shown in FIG. 5, the inductor layer includes a plurality of inductor units 21. In an embodiment, the inductor layer is formed on a base substrate of a display substrate having the black matrix layer as an in-cell structure, a projection of each inductor unit 21 of the inductor layer substantially overlapping with that of a portion of the shading lines of the black matrix layer 24. Optionally, the inductor layer is formed on a side of the black matrix layer distal to the base substrate. Optionally, the inductor layer is formed on a side of the black matrix layer proximal to the base substrate. Optionally, the inductor layer is on a side of the base substrate distal to the black matrix layer.

In some embodiments, each of the plurality of inductor units 21 includes one pattern selected from a group of a square multi-turn spiral coil, a rectangular multi-turn spiral coil, and a multi-turn square waveform coil. Alternatively, it may be a pattern including a combination of some subcomponents of all above coil patterns. In some embodiments, each of the multiple inductor planar coil patterns includes a plurality of substantially parallel adjacent line segments and each two parallel adjacent line segments are spaced apart by no more than two light transmissive regions. Optionally, each two parallel adjacent line segments are spaced apart by a single light transmissive region. This is substantially a dense arrangement for the planar coil pattern as it is projected to align with the shading lines of black matrix layer.

Optionally, the conductive wire of the inductor planar coil pattern has a line width set to be substantially the same as or smaller than that of a line width of the black matrix layer so that the placement of the inductor planar coil pattern 21 on the base substrate bearing the black matrix layer does not blocking of light transmittance through those light transmissive regions. Therefore, adding the touch sensing apparatuses to the base substrate as an in-cell structure of the display substrate would not cause a reduction of pixel aperture ratio of a display panel. Optionally, the conductive wire of the inductor planar coil pattern has a line width slightly larger than the line width of the black matrix layer.

Figure 6:
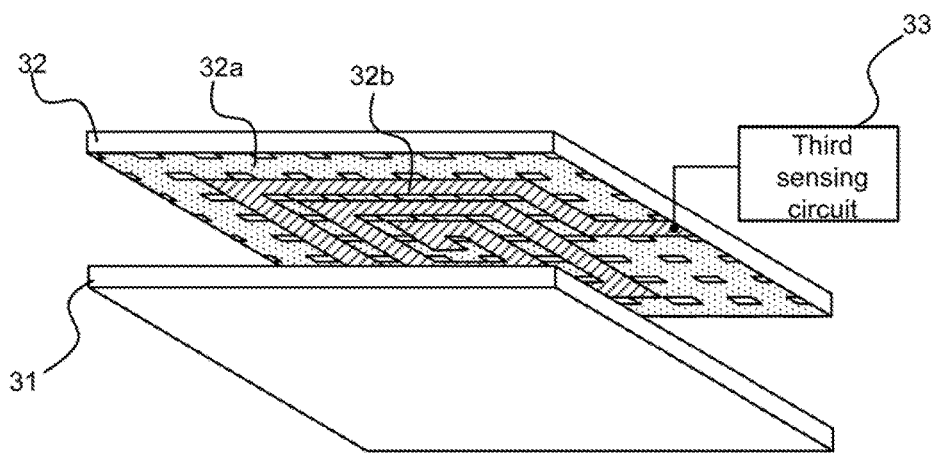
FIG. 6 is a schematic diagram showing a touch sensing apparatus disposed as an in-cell structure in a display panel according to an embodiment of the present disclosure.

FIG. 6 is a schematic diagram showing a touch sensing apparatus disposed as an in-cell structure in a display panel according to an embodiment of the present disclosure. Referring to FIG. 6, the display panel includes an in-cell touch sensing apparatus. The display panel is assembled by attaching a color filter substrate 32 onto an array substrate 31. On a side of the color filter substrate 32, a black matrix layer 32a is formed to define a plurality of light transmissive regions of the display panel. In the same color filter substrate 32, an inductor layer is formed and arranged in an inductor unit 32b having a planar coil pattern substantially overlapping with a part of the black matrix layer 32a. Each inductor unit 32b at different locations of the color filter substrate 32 has a terminal connected to a third sensing circuit 33. The third sensing circuit 33 provides a pre-set AC signal through the terminal to each inductor unit 32b having a planar coil pattern and is configured to compare a sensed signal from each inductor unit 32b having a planar coil pattern and the pre-set AC signal for detecting a change of the AC signal induced by a touch motion on the display panel as well as a touching location on the display panel.

Figure 7:
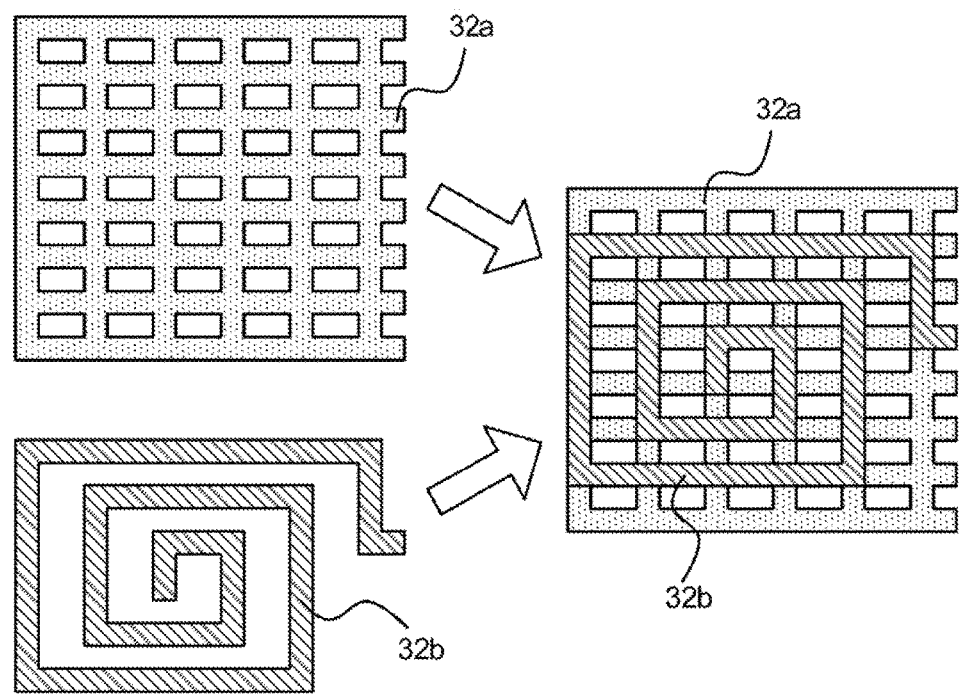
FIG. 7 is a schematic diagram showing location correspondence relationship between an inductor planar coil pattern and multiple connected segments of black matrix layer in a display panel according to an embodiment of the present disclosure.

FIG. 7 is a schematic diagram showing location correspondence relationship between an inductor planar coil pattern and multiple connected segments of black matrix layer in a display panel according to an embodiment of the present disclosure. FIG. 7 is alternative direct top view of the location correspondence between the black matrix layer and the inductor coil pattern of FIG. 6. Referring to FIG. 7, each line segment of the inductor unit 32b is substantially formed so that a projection of which substantially overlapping with that of a corresponding line segment of the black matrix layer 32a in the color filter substrate 32, leaving the light transmissive regions completely unaffected (as seen in FIG. 5). Each light transmissive region corresponds to a single color sub-pixel region defined by pre-set pixel payout of the display panel. Therefore, the touch sensing apparatus added as an in-cell structure of the display panel causes no reduction in pixel aperture of the display panel.

Optionally, the third sensing circuit 33 (FIG. 6) includes a plurality of first sensing circuit (e.g., the first sensing circuit 12 as shown in FIG. 1) respectively coupled to the plurality of inductor units 32b. Each first sensing circuit 12 is able to sense a finger touch motion at the same time. Optionally, the third sensing circuit 33 further includes a data selection circuit (not explicitly shown) coupled to all the first sensing circuits 12 bearing a serial number for each connection. Based on a pre-established correspondence relationship between a serial number and an inductor pattern 32b, the third sensing circuit 33 through the data selection circuit is able to determine if there is a motion of a finger touching the display panel from each sensed signal received from each first sensing circuit 12. The third sensing circuit 33 is also able to obtain touching location information through identification of where the sensing signals are received from specific first sensing circuits 12 by the data selection circuit whenever a finger touches the display panel. Optionally, the display panel that is combined with the touch screen of the present disclosure is a Liquid Crystal Display (LCD) panel. Optionally, the display panel is an Organic Light-Emitting Diode (OLED) panel. Other types of display panel based on alternative display technologies can be made with a touch screen of the present disclosure.

In another aspect, the present disclosure provides a display substrate having a touch sensing apparatus for detecting a touch motion by induction. The touch sensing apparatus includes a base substrate and a black matrix layer on the base substrate defining a plurality of light transmissive regions. Optionally, the touch sensing apparatus further includes an inductor layer on the base substrate. The inductor layer includes at least one inductor unit. Each of the at least one inductor unit has a multi-turn planar coil structure. A projection of the inductor layer on the base substrate substantially overlaps with that of a portion of the black matrix layer. The touch sensing apparatus further includes at least one first sensing circuit coupled to the at least one inductor unit and configured to be provided with an AC signal and to detect a change of the AC signal induced by the touch motion. Optionally, the display substrate is a color filter substrate. Optionally, the display substrate is an array substrate.

Optionally, the display substrate is a color filter substrate having a common electrode layer. Each of the at least one first sensing circuit includes an output port coupled to a first terminal of the at least one inductor unit and a common voltage terminal coupled to a second terminal of the at least one inductor unit. The AC signal is provided to the inductor unit through the output port. The common voltage terminal and the second terminal are coupled to the common electrode layer. Optionally, the color filter substrate further includes an insulating layer between the inductor layer and the common electrode layer, and the second terminal is coupled to the common electrode layer through a via extending through the insulating layer.

Figure 8:
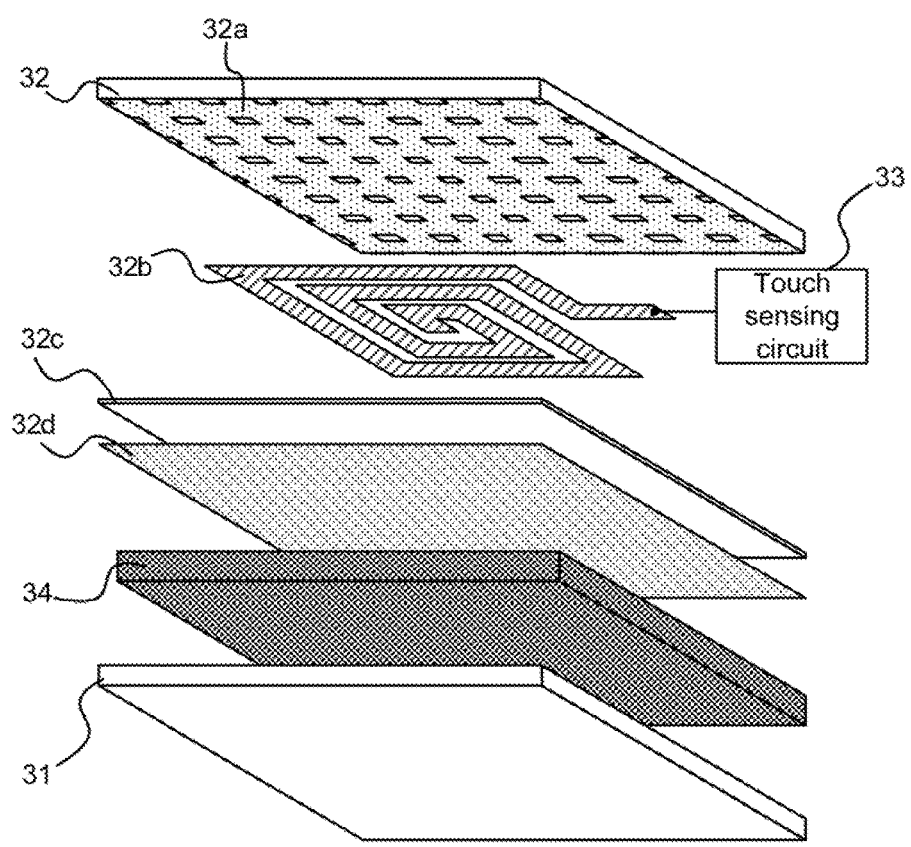
FIG. 8 is a schematic diagram showing a touch sensing apparatus disposed in a liquid crystal display panel according to an embodiment of the present disclosure.

FIG. 8 is a schematic diagram showing a touch sensing apparatus disposed in a liquid crystal display panel according to an embodiment of the present disclosure. Referring to FIG. 8, the display panel includes at least an array substrate 31 provided with a plurality of sub-pixel-driving circuits and a color filter substrate 32 including a plurality of color light transmissive regions framed by segments of a black matrix layer 32a, with both substrates 31 and 32 being assembled together in a relative feature-correspondence setting by matching each sub-pixel location in the array substrate 31 to a corresponding color light transmissive region. The display panel also includes a liquid crystal layer 34 formed on the array substrate 31. A common electrode layer 32d is formed on a side of the liquid crystal layer 34 distal to the array substrate 31. Each sub-pixel driving circuit in the array substrate includes a pixel electrode layer formed at a corresponding sub-pixel location at a side of the array substrate 31 in contact with the liquid crystal layer 34. In an embodiment, the liquid crystal layer 34 is subject to light deflections due to changing crystalline orientations driven by an electrical field between a pixel electrode layer and the common electrode layer. The electrical field at different sub-pixel locations can be controlled via the sub-pixel driving circuit to generate different liquid crystal deflections so as to affect transmittance of light from a backlight source through different sub-pixel locations, effectively producing desired light intensity distribution required for displaying a particular image. The color filter substrate 32 further includes a black matrix layer 32a for bordering the plurality of light transmissive regions. Each light transmissive region is configured to be a filter of a particular color opposing to a particular sub-pixel location to form one of sub-pixels for transmitting the particular colored light while the black matrix layer 32a serves a grid of shading structure bordering the plurality of sub-pixels. In an embodiment, the color filter substrate 32 is configured to dispose a plurality of touch sensing apparatuses as an in-cell structure by forming a plurality of inductor unit 32b substantially along line segments of the black matrix layer 32a on a side of the color filter substrate 32. FIG. 8 shows one of the inductor unit 32b having a planar coil pattern substantially matched with a part of the black matrix layer 32a. Each inductor unit 32b includes two terminals, one being connected to an output port of a first sensing circuit 33 and another being optionally connected to a common voltage terminal GND (not explicitly shown). The first sensing circuit 33 is configured to supply a pre-set AC signal through the output port into the inductor unit 32b to generate a magnetic field designated for detecting any touch motion nearby. The first sensing circuit 33 is configured to receive a sensed signal induced by any touch motion and is configured to compare the sensed signal with the pre-set AC signal for obtaining a change of the AC signal which characterizes the touch motion.

Figure 9:
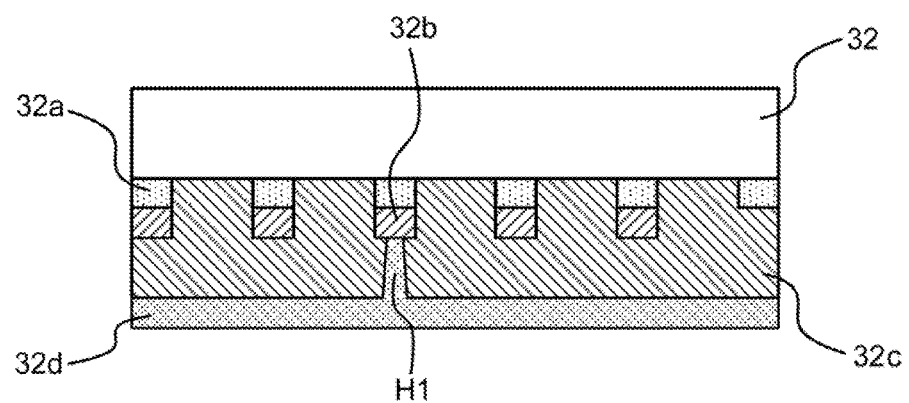
FIG. 9 is a cross-section view of a color filter substrate in the liquid crystal display panel of FIG. 8 according to an embodiment of the present disclosure.

FIG. 9 is a cross-section view of a color filter substrate in the liquid crystal display panel of FIG. 8 according to an embodiment of the present disclosure. Referring to FIG. 8, an insulator layer 32c is formed overlying the plurality of inductor units 32b from the point of view of the color filter substrate 32. The same insulator layer 32c overlays a conductor layer 32d and includes a plurality of through-holes formed therein. Each through-hole is filled with a conductor material to form a conductor via. Each inductor pattern 32b includes two terminals. Referring to FIG. 9, an inductor pattern 32b is laid just under a black matrix layer 32a at the backside of the color filter substrate 32 and covered substantially by the insulator layer 32c except a through-hole H1 formed at the location for forming a conductor via connected to the conductor layer 32d below. At least one of the two terminals of each inductor pattern 32b is configured to connect to the conductor layer 32d by the conductor via H1 extending through the insulator layer 32c. The conductor layer 32d can be supplied by a common voltage source connected to terminal GND and served as a common electrode layer for both the first sensing circuit (for detecting touch motion above a cover of the color filter substrate) and the sub-pixel circuit (for driving light deflection in the liquid crystal layer).

In another aspect, the present disclosure provides a method of forming a touch sensing apparatus with a display panel. The method is illustrated through an expanded view of the structure of the touch sensing apparatus disposed in an exemplary liquid crystal display panel depicted in FIG. 8 and a cross-section view of local region of a touch sensing apparatus depicted in FIG. 9. Referring to FIG. 8 and FIG. 9, the method of forming a touch sensing apparatus with a display panel includes providing a base substrate associated with a display panel. In some embodiments, the method includes forming a black matrix layer on the base substrate thereby defining a plurality of light transmissive regions; and forming an inductor layer on the base substrate. The inductor layer is formed to include at least one inductor unit having a multi-turn planar coil structure. A projection of the inductor layer on the base substrate substantially overlaps with that of a portion of the black matrix layer. Optionally, the method further includes forming at least one first sensing circuit coupled to the at least one inductor unit and configured to be provided with an AC signal and to detect a change of the AC signal induced by the touch motion.

In another alternative aspect, the present disclosure provides a method of fabricating a display substrate. The method includes forming a black matrix layer on a base substrate thereby defining a plurality of light transmissive regions; and forming an inductor layer having a plurality of inductor units on the base substrate. Each of the plurality of inductor units has a multi-turn planar coil structure. A projection of the inductor layer on the base substrate substantially overlaps with that of a portion of the black matrix layer. Optionally, the method further includes forming at least one first sensing circuit coupled to the plurality of inductor units and configured to be provided with an AC signal and to detect a change of the AC signal induced by the touch motion. Optionally, the method includes forming a common electrode layer. Each of the plurality of inductor units is formed to include a first terminal and a second terminal. Each of the plurality of first sensing circuits is formed to include an output port coupled to the first terminal and a common voltage terminal coupled to the second terminal. The AC signal is provided to the inductor through the output port. The common voltage terminal and the second terminal are coupled to the common electrode layer. Optionally, the method further includes forming an insulating layer between the inductor layer and the common electrode layer, and forming a via extending through the insulating layer. The second terminal is coupled to the common electrode layer through the via extending through the insulating layer.

In another aspect, the present disclosure provides a display panel having the display substrate as described herein. Optionally, the display panel includes an in-cell touch sensing apparatus having a plurality of inductor units each having a planar coil pattern substantially laid under the black matrix layer. Optionally, the touch sensing apparatus can be formed as an on-cell apparatus on a base substrate of a color filter substrate of the display panel.

In another aspect, the present disclosure provides a display apparatus having a display panel described herein. Examples of appropriate display apparatuses includes, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display substrate for detecting a touch motion by induction, comprising:
a base substrate;
a black matrix layer on the base substrate defining a plurality of light transmissive regions;
an inductor layer on the base substrate, the inductor layer comprising at least one inductor, each of the at least one inductor having a multi-turn planar coil structure, a projection of the inductor layer on the base substrate substantially overlapping with that of a portion of the black matrix layer;
at least one first sensing circuit coupled to the at least one inductor and configured to be provided with an AC signal and to detect a change of the AC signal induced by the touch motion;
a common electrode layer; and
an insulating layer between the inductor layer and the common electrode layer;
wherein each of the at least one inductor comprises a first terminal and a second terminal, each of the at least one first sensing circuit comprises an output port coupled to the first terminal of a corresponding inductor, the AC signal being provided to the corresponding inductor through the output port, and the second terminal being provided with a common voltage;
each of the at least one first sensing circuit comprises an output port coupled to a first terminal of the at least one inductor and a common voltage terminal coupled to a second terminal of the at least one inductor, the AC signal being provided to the inductor through the output port, and the common voltage terminal and the second terminal are coupled to the common electrode layer; and
the second terminal is coupled to the common electrode layer through a via extending through the insulating layer.

2. The display substrate of claim 1, wherein a line width of the multi-turn planar coil structure is substantially the same as or smaller than a line width of the black matrix layer.

3. The display substrate of claim 1, wherein the multi-turn planar coil structure comprises a plurality of substantially parallel adjacent line segments, each two parallel adjacent line segments being spaced apart by no more than two light transmissive regions.

4. The display substrate of claim 1, wherein the multi-turn planar coil structure comprises a plurality of substantially parallel adjacent line segments, each two parallel adjacent line segments being spaced apart by a single light transmissive region.

5. The display substrate of claim 1, wherein the multi-turn planar coil structure is selected from a group consisting of a square multi-turn spiral coil, and a rectangular multi-turn spiral coil.

6. The display substrate of claim 1, wherein each of the at least one first sensing circuit further comprises a common voltage terminal coupled to the second terminal of the corresponding inductor, the common voltage terminal and the second terminal being provided with a common voltage.

7. The display substrate of claim 1, wherein the at least one inductor comprise a plurality of inductors arranged in a matrix on the base substrate, the at least one first sensing circuit comprises a plurality of first sensing circuits coupled to the plurality of inductors respectively, each of the plurality of first sensing circuits is configured to independently detect the change of the AC signal in one of the plurality of inductors induced by the touch motion.

8. The display substrate of claim 7, further comprising a data selection circuit configured to receive one or more of changes of AC signals from one or more of the plurality of first sensing circuits, select any one of the one or more of changes of AC signals transmitted from the one or more of the plurality of first sensing circuits as a selected change of the AC signal, and output the selected change of the AC signal.

9. The display substrate of claim 1, wherein the inductor layer is on a side of the black matrix layer distal to the base substrate.

10. The display substrate of claim 1, wherein the inductor layer is on a side of the black matrix layer proximal to the base substrate.

11. The display substrate of claim 1, wherein the inductor layer is on a side of the base substrate distal to the black matrix layer.

12. The display substrate of claim 1, wherein the base substrate is a base substrate of a color filter substrate in a display panel, each of the plurality of light transmissive regions corresponding to a subpixel region of the display panel.

13. The display substrate of claim 1, wherein the base substrate is a base substrate of an array substrate in a display panel, each of the plurality of light transmissive regions corresponding to a subpixel region of the display panel.

14. The display substrate of claim 1, wherein the display substrate is a color filter substrate.

15. A display panel comprising the display substrate of claim 1.

16. A display apparatus, comprising the display panel of claim 15.

17. A method of fabricating a display substrate for detecting a touch motion by induction, comprising:
   forming a black matrix layer on a base substrate, wherein the black matrix layer is formed to define a plurality of light transmissive regions;
   forming an inductor layer comprising at least one inductor on the base substrate, each of the at least one inductor having a multi-turn planar coil structure, a projection of the inductor layer on the base substrate substantially overlapping with that of a portion of the black matrix layer;
   forming at least one first sensing circuit coupled to the at least one inductor and configured to be provided with an AC signal and to detect a change of the AC signal induced by the touch motion;
   forming a common electrode layer; and
   forming an insulating layer between the inductor layer and the common electrode layer;
   wherein each of the at least one inductor is formed to comprise a first terminal and a second terminal, each of the at least one first sensing circuit is formed to comprise an output port coupled to the first terminal of a corresponding inductor, the AC signal being provided to the corresponding inductor through the output port, and the second terminal being provided with a common voltage;
   each of the at least one first sensing circuit is formed to comprise an output port coupled to a first terminal of the at least one inductor and a common voltage terminal coupled to a second terminal of the at least one inductor, the AC signal being provided to the inductor through the output port, and the common voltage terminal and the second terminal are coupled to the common electrode layer; and
   the second terminal is formed to be coupled to the common electrode layer through a via extending through the insulating layer.

* * * * *